Nov. 2, 1937. H. HEMMERICH 2,097,763
KNITTED STOCKING
Filed May 29, 1934  7 Sheets-Sheet 2

Nov. 2, 1937.   H. HEMMERICH   2,097,763
KNITTED STOCKING
Filed May 29, 1934   7 Sheets-Sheet 3

INVENTOR:
Hugo Hemmerich,
BY
ATTORNEY.

Nov. 2, 1937. H. HEMMERICH 2,097,763
KNITTED STOCKING
Filed May 29, 1934   7 Sheets-Sheet 4

INVENTOR:
Hugo Hemmerich,
BY
ATTORNEY.

Nov. 2, 1937.        H. HEMMERICH        2,097,763
KNITTED STOCKING
Filed May 29, 1934        7 Sheets-Sheet 7

INVENTOR:
Hugo Hemmerich,
BY Alfred E. Ischinger
ATTORNEY.

Patented Nov. 2, 1937

2,097,763

UNITED STATES PATENT OFFICE 2,097,763

KNITTED STOCKING

Hugo Hemmerich, Wyomissing, Pa., assignor to Berkshire Knitting Mills, Wyomissing, Pa., a corporation of Pennsylvania Application May 29, 1934, Serial No. 728,084

1 Claim. (Cl. 66—178)

My invention relates to knitted articles of wearing apparel, such as hosiery, and particularly to a novel means for, and method of, embodying therein certain new fabric characteristics.

This application is in part a continuation of my application Serial No. 724,865, filed May 10, 1934.

Heretofore the surface effects obtainable in knitted hosiery, particularly ladies' stockings, have been limited, for example, the stockings have exhibited either a glossy or a dull-lustre appearance. Also, various surface, texture, pattern, striping, shading and design effects comparable to those of woven fabrics, such as crepe, whipcord, chiffon, georgette, voile, etc., in which both warp and weft strands enter into and determine the appearance of the fabric, have heretofore not been obtainable in knitted stockings.

One object of my invention is to enable the attainment, in knitted stockings, of effects more nearly approaching or simulating the various above mentioned and other desirable effects heretofore unobtainable in knitted stockings, and also to produce a great variety of new fabric characteristics in stockings or portions thereof, by selectively mixing or commingling, throughout the loop formation of any desired portion of the stocking, a plurality of series of contiguous yarn zones each comprising one or more courses of a yarn, the yarns of the individual zones of each series respectively differing from each other in one or more characteristics, the commingled zones giving to the fabric a characteristic which is the resultant of the individual characteristic of the zones.

Specifically, and in accordance with one embodiment of the invention, the zones of each series respectively comprise yarns differing in size relative to each other so as to selectively increase or decrease the light reflecting properties of the yarns, and to make possible the use of different relative proportions of the yarns, the zones being adapted to be commingled in various arrangements to produce certain of the above effects; in a second embodiment, the zones of each series respectively comprise yarns of different types, as different textures or different constructions; in a third embodiment, yarns of different sizes and different twist characteristics are employed to form the respective zones. Also, various color effects may be introduced into any of the foregoing embodiments by suitable selection of yarn colors for the constituent yarns, or by adding thereto one or more additional yarns of suitable color.

Another object is to produce stockings from relatively high twist yarn of the same or different types, to produce a desired dull-lustre effect, which stockings also will have certain desired subdued striping or shading effects; more particularly, yarns of different twists and/or sizes are alternated in a series of yarns, the yarn or yarns of higher twist producing among other things, the dull-lustre effect, and the yarn or yarns of lower twist coacting therewith to give the desired surface, texture, or design effect.

With these and other objects in view, which will become apparent from the following detailed description of the illustrative embodiments of the invention shown in the accompanying drawings, my invention resides in the novel fabrics and articles, and method of producing the same, as hereinafter more particularly set forth in the claim.

Figure 1:
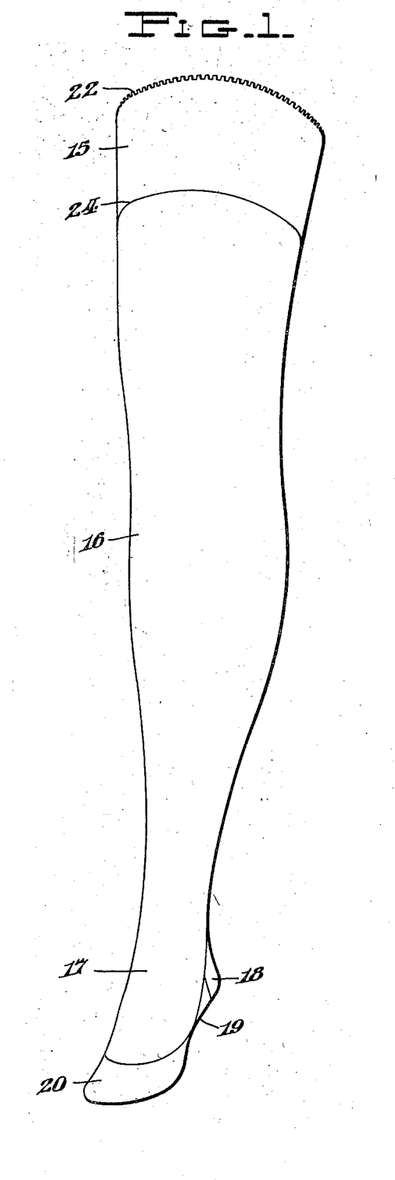
Figure 1 is a front perspective view of a lady's full fashioned silk stocking embodying the invention.
Figure 2:
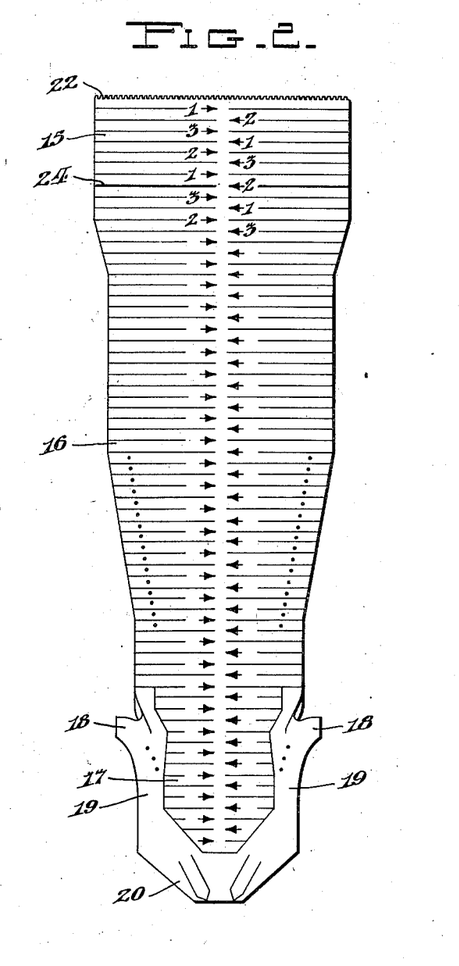
Fig. 2 is a diagrammatic view, on a smaller scale, illustrating the method of knitting the blank from which the stocking of Fig. 1 is formed.

Referring particularly to Figs. 1 and 2, the stocking is shown as comprising a welt 15, leg portion 16, instep 17, heel portion 18, sole 19, and toe 20; Fig. 2 illustrates the stocking blank as it is produced on the conventional full fashioned stocking knitting machine. The stocking may have a single ply welt or a multiple ply welt; preferably, and as shown, it comprises a two-ply or double wall welt, with a picot edge 22 where the welt is turned, the inner and outer walls of the welt extending between the picot course and the welt line 24. Also, the stocking may be substantially composed of plain knit courses throughout, as illustrated, or it may comprise special loop formations, lace, clockwork, or other designs or patterns, for example, and by way of illustration only, as shown in Design Patents Nos. 83,614, 86,601, 89,761, 89,762 and 89,763. The invention may be employed throughout the entire length of the stocking, as indicated in Fig. 2, or may be employed only in the leg portion 16, or in restricted areas only of the stocking, such as the welt, depending upon the particular effect desired.

Figure 4:
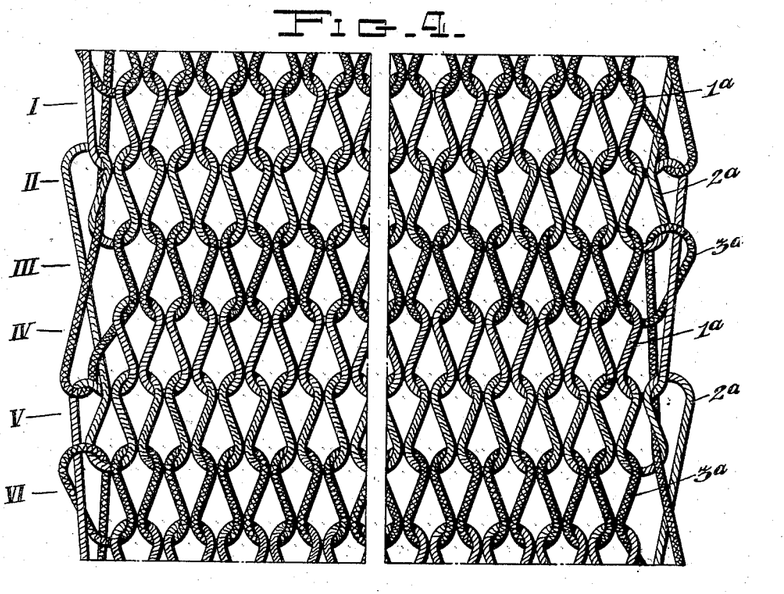
Fig. 4 is an enlarged detail view of a patch of stocking fabric comprising a multiplicity of series of commingled yarn zones, each series comprising three yarn zones respectively knit from separate yarns of the same size, at least two of which are of different twist characteristics and different colors, and representing a section of the fabric of the blank of Fig. 2.
Figures 15, 16, 17, 18, 19:
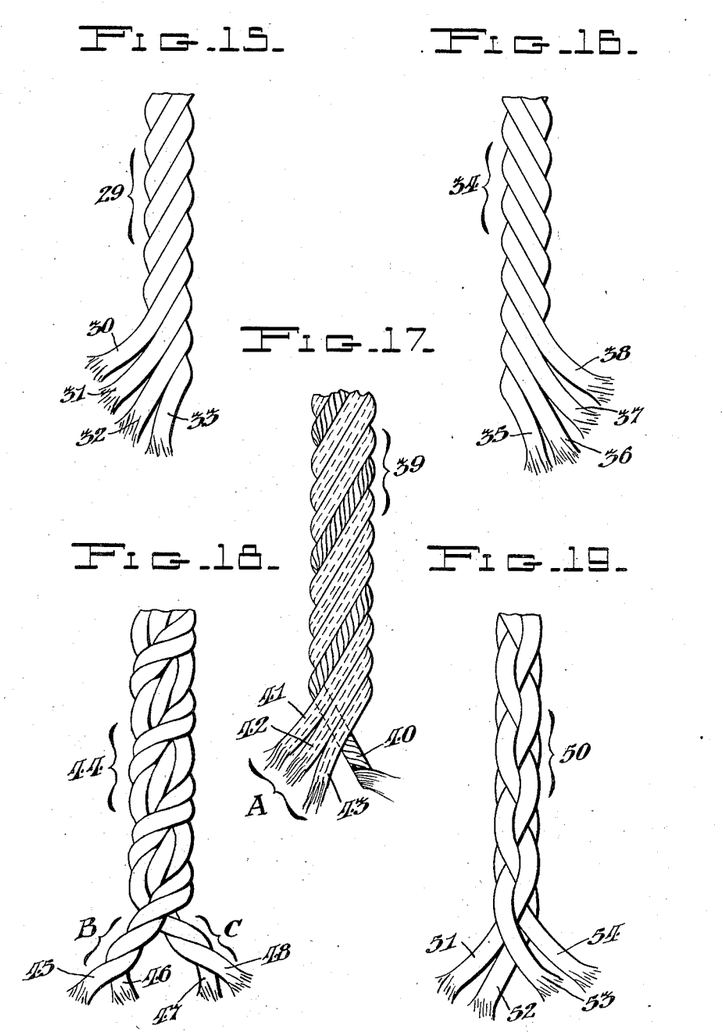
Figs. 15 to 19 illustrate various yarns of different types adapted for use in practicing the invention.

Fig. 4 is an enlarged detail view of the fabric from which the stocking of Fig. 1 is substantially composed. As shown in the detail view, the fabric comprises a multiplicity of series of yarn zones, each zone comprising three courses, such as I, II, III, or IV, V, VI, etc., the courses of each such zone respectively being knit from separate body yarns 1a, 2a and 3a, at least two of the yarns, such as 1a and 2a, respectively being of different textures or comprising different yarn constructions, as different twist characteristics, and one of the yarns 3a being of a different color from the other yarns thereby to produce a desired color effect. For example, one or two of the yarns may comprise relatively high twist yarns and the other yarn or yarns may comprise relatively low twist yarns, in which case the high twist yarn or yarns give a desired dull lustre or other characteristics to the stocking, while the low twist yarn or yarns give a softness, depth, richness of appearance, or other desired characteristic to the stocking, depending upon the texture or construction of the yarn. Also, one or two of the three yarns may be right twist yarns, and the other yarn or yarns may be left twist yarns, and the yarns may have the same or a different number of twists per inch or other unit length thereof. Fig. 15 shows a right twist yarn 29 comprising filaments or strands 30—33 individually twisted in one and the same direction, the strands being unitedly twisted in a direction to produce a right twist yarn, while Fig. 16 shows a yarn 34 comprising strands 35—38 individually twisted in one and the same direction, and unitedly twisted in a direction to produce a left twist yarn, either or both of these yarns being suitable for producing various effects.

Furthermore, one, two or all of the three yarns of each zone may respectively comprise yarns of various other specifically different constructions or twist characteristics such, for example, as shown in Figs. 17 to 19 inclusive. Fig. 17 illustrates a type of yarn disclosed in my Patent No. 1,897,051, issued February 14, 1933; in the specific embodiment shown, the yarn 39 comprises a single strand 40 twisted approximately thirty-six turns per inch to the right and combined with a group A of three untwisted strands 41, 42 and 43, the single strand 40 and the group A of strands being unitedly twisted to the left about thirty-two turns per inch. Various other forms of yarns disclosed in my aforesaid patent can also be employed, as well as yarns such as disclosed in Haytock Patent No. 1,915,929, issued June 27, 1933. Fig. 18 shows another type of yarn suitable for use in the manner above stated, the yarn 44 of the figure comprising two groups B and C, the group B comprising two filaments or strands 45 and 46 twisted together in one direction, and group C comprising two strands 47 and 48 twisted in a direction opposite that of group B, the two groups of strands being unitedly twisted together. Fig. 19 discloses a yarn 50 comprised of individual strands 51—54 interwoven together to produce a braided yarn having a desired softness and richness of appearance, or other desired characteristic.

In the yarns of Figs. 17, 18 and 19, there is an interrupted line effect, as distinguished from the uninterrupted helical line effect of an ordinary twisted yarn. In the yarn of Figs. 17 and 18, this interrupted line effect takes the form of circumferential zones alternately along the yarn having substantially longitudinal and lateral line effects, respectively. In the yarn of Fig. 19, the interrupted line effect is provided by the interception of the braid lines with each other; the effect in each case being different from any effect obtainable with yarns having the uninterrupted helical twist lines of usual twisted yarns.

The foregoing yarns may comprise various known types, such as crepe, grenadine, compensene, tram, etc., and the yarns may be disposed in any order to give the desired appearance or other characteristics to the fabric and the stocking made therefrom.

The fabric above described, employing any of the foregoing yarns or any combination thereof, may be knit by hand, either on a knitting frame or on a knitting machine, by alternately feeding in selected courses of the fabric the desired yarns to the needles; and may automatically be produced on a straight or full fashioned stocking knitting machine employing various yarn carrier rod control devices known in the art for alternately reciprocating selected yarn carrier rods, such, for example, as the carrier control devices employed for producing "ringless" hosiery.

Figure 11:
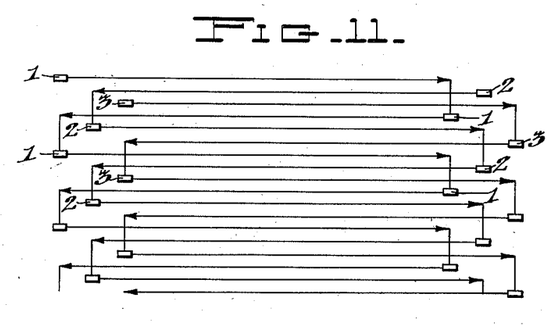
Fig. 11 diagrammatically illustrates the movements of the yarn carriers in producing the fabrics of Figs. 4 to 10.
Figure 14:
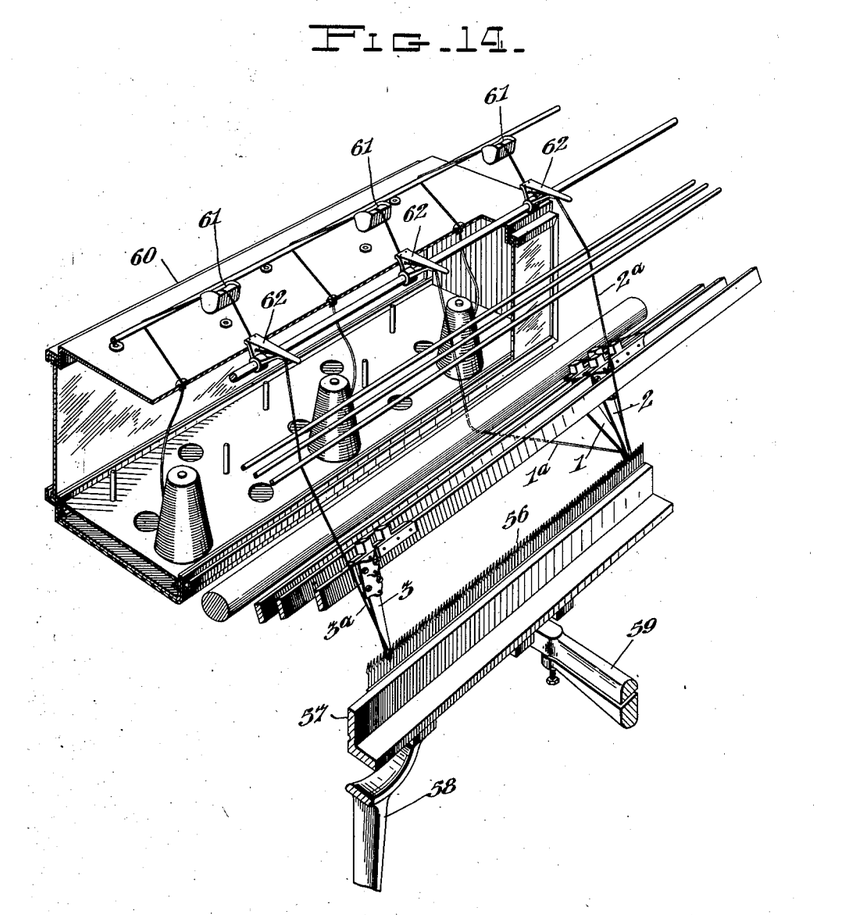
Fig. 14 is a perspective view of certain parts of a full fashioned knitting machine involved in laying three yarns alternately in succeeding courses of the fabric, and adapted to produce the fabric of the invention.

Figs. 2 and 11 illustrate one method of knitting the blank of the stocking of Fig. 1. In Fig. 2, the horizontal lines between the picot edge 22 and the end of the instep portion 17 of the stocking diagrammatically represent the paths of travel of the main yarn carriers of a full fashioned stocking machine on which the blank is knit, the arrows on the lines indicating the direction of travel in successive courses of the yarn carriers, Figs. 11 and 14, the carriers being referred to as Nos. 1, 2, and 3, althought it will be understood that various of the seven or eight carriers usually embodied in a stocking knitting machine may be employed, if desired.

As above stated, the stocking fabric of the invention may be automatically produced on a full fashioned stocking knitting machine embodying various striping attachments or three carrier "ringless" stocking attachments, the various parts and mechanisms and manner of operation of which are well known in the art. For the sake of clearness I have illustrated in Fig. 14 only those parts of the knitting machine necessary for an understanding of the invention. As usual, the needles 56 of each knitting section are supported in a needle bar 57 which is given the necessary vertical and horizontal movements by the needle bar actuating levers 58, 59 controlled by needle lever and presser lever cams on the main cam shaft in known manner. In the figure, the usual yarn box 60 is shown partially broken away to disclose three bobbins feeding the silk yarns 1a, 2a and 3a, the yarns passing over moistening troughs 61 and through snappers 62 in the usual manner to their respective carriers 1, 2 and 3. The method of actuating the carriers to alternate the yarns in succeeding courses throughout the fabric is diagrammatically illustrated in Fig. 11, and is as follows:

One of the carriers, for example No. 1, is caused to traverse the knitting field from left to right, as viewed in Fig. 11, and lay the yarn 1a carried by it to form a course I, Fig. 4, while carriers 2 and 3 are respectively held at the right and left sides of the knitting section. In the next succeeding course II, No. 2 carrier lays its yarn 2a from right to left, while Nos. 1 and 3 carriers are held at opposite sides respectively of the knitting section. In the next course III, No. 3 carrier lays the yarn from left to right, Nos. 1 and 2 carriers being held at the opposite sides respectively of the knitting section at this time. In the next three succeeding courses IV, V, VI, the cycle of operation of the carriers is repeated, each yarn carrier travelling in an opposite direction from that of its travel in the preceding series of courses since each of the carriers starts from an opposite side of the knitting section.

The three main yarns 1a, 2a, 3a are thus caused to alternate throughout substantially the entire length of the stockings, or any desired portion thereof, and thus produce the desired effect caused by a multiplicity of series of contiguous yarn zones, each series comprising three yarn zones respectively knit from separate yarns of different twists and colors, the combined effects of the yarn zones coacting to produce various of the above mentioned desired effects heretofore unobtainable in knitted stockings.

Figure 3:
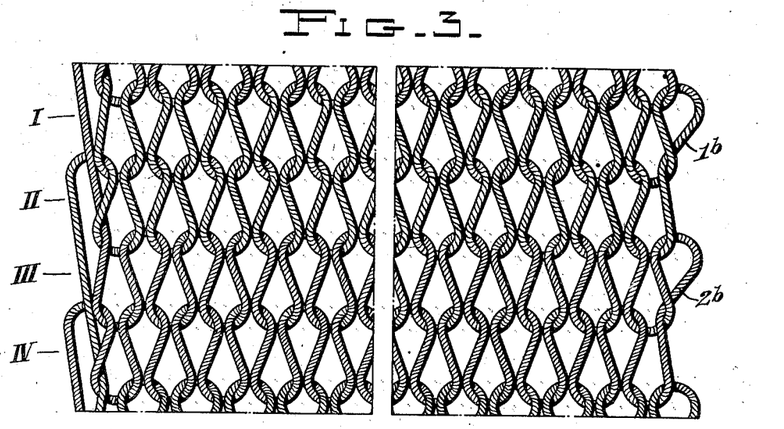
Fig. 3 is an enlarged detail view of a patch of a stocking fabric in accordance with one illustrative form of the invention, the fabric comprising a multiplicity of series of commingled yarn zones repeated throughout the fabric, each zone comprising two courses of yarn, the yarn zones of each series being respectively knit from separate body yarns of the same size and color, but of different twist characteristics.
Figure 12:
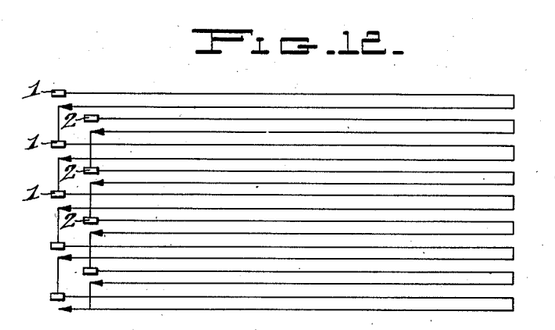
Fig. 12 diagrammatically illustrates the movements of the yarn carriers in knitting the fabric of Fig. 3.

Fig. 12 diagrammatically illustrates the movements of the yarn carriers in knitting the fabric of Fig. 3. One of the carriers, for example, No. 1 carrier, is caused to traverse the knitting field from left to right, as viewed in Fig. 12, and lay the yarn 1b carried by it to form a course I, Fig. 3, and in the succeeding course II the carrier is caused to traverse the knitting field from right to left, thus forming a zone comprising two adjacent courses I, II from the yarn 1b carried by No. 1 carrier, No. 2 carrier being held at this time at the left hand side of the knitting section. In the succeeding two courses III, IV, No. 1 carrier is held at the left hand side of the knitting section, and No. 2 carrier is caused to travel from left to right in one course and return in the succeeding course, thus forming a zone comprising the courses III, IV from the yarn 2b carried by No. 2 carrier. This cycle of operation of the yarn carriers is repeated in the succeeding courses, and in this manner the yarns 1b and 2b, of the same size but of different twists, respectively, are disposed in successive zones commingled throughout substantially the entire length of the stocking, or any desired portion thereof.

The fabric of Fig. 3 may also be produced by the use of the above mentioned three carrier control attachment employed in producing "ringless" stockings, in which case three yarns may be employed, two of which have the same characteristics. For example, the zone comprising courses I, II may be knit from two separate yarns each having the characteristics of the yarn 1b, while the third yarn 2b of different twist is employed in the zone comprising courses III and IV. In this case, the fabric may be knit generally in the same manner as the fabric of Fig. 4 hereinbefore described.

Figure 13:
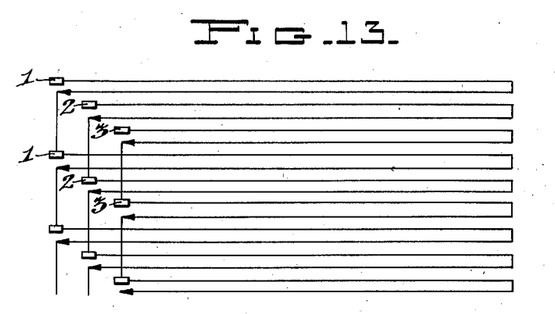
Fig. 13 diagrammatically illustrates the movements of the yarn carriers in producing another form of the fabric.

Fig. 13 diagrammatically illustrates the movements of yarn carriers in knitting a further form of my invention, in which three yarn carriers are employed for feeding three yarns, any one or two of which may have different characteristics from the other yarn or yarns, and in which any of the yarns may comprise those having the above mentioned characteristics. As indicated, the yarn in one of the courses of each series is laid by causing one of the carriers, such as No. 1 carrier, to traverse the knitting field from left to right, and in the succeeding course the carrier travels from right to left, thus forming a zone comprising two contiguous courses from the yarn carried by No. 1 carrier, Nos. 2 and 3 carriers being held at this time at the left hand side of the knitting section. In the succeeding two courses No. 2 carrier is caused to travel from left to right in one course and return in the next course, as indicated by the arrows, thus forming the next zone of two courses from the yarn carried by No. 2 carrier, Nos. 1 and 3 carriers being held at this time. In the following two courses, No. 3 carrier is caused to travel from left to right in one course and return in the succeeding course, thus forming a zone of these courses from the yarn carried by No. 3 carrier, carriers Nos. 1 and 2 being held at this time. This cycle of operation of the carriers is then repeated throughout substantially the length of the stocking, or any desired portion thereof, to produce a multiplicity of series of such zones.

Figure 5:
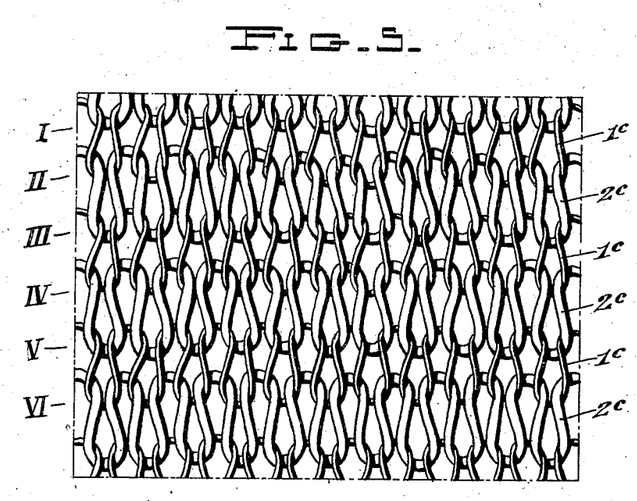
Fig. 5 is an enlarged detail view of a patch of stocking fabric comprising a multiplicity of series of commingled yarn zones respectively knit from separate yarns of the same twist and color, but of different sizes, in accordance with another form of the invention.

Fig. 5 is an enlarged detail view of another embodiment of the invention, in which the fabric comprises zones of successive courses I, II, etc., respectively knit from light and heavy yarns 1c and 2c of substantially the same twist characteristics. The heavier yarn 2c will, in general, determine the appearance, surface, or pattern effect of the stocking since the appearance of the prominent surface of the heavier yarn will be the controlling factor in determining the appearance of the stocking irrespective of the appearance of the smaller yarn. Thus, if the heavier yarn has one or more distinctive strands therein, such, for example, as disclosed and claimed in my aforesaid Patent No. 1,897,051, such yarn will give the desired appearance to the stocking. The use of lighter and heavier yarns may also be employed to produce various shading or subdued stripe effects heretofore not obtainable in knitted stockings.

A further advantage of the combination of yarns of different sizes lies in the fact that the heavier yarn 2c prevents wear on, and minimizes rupture of, the light yarn 1c because the heavier yarn protrudes at the outer face of the fabric which is subject to abrasion and contact with foreign objects that tend to rupture or otherwise injure the smaller yarn. In producing the fabric of Fig. 5 on a straight knitting machine, it will be seen that since but two yarns 1c and 2c are employed, each of which forms a single course only in a zone, it will be necessary to employ an idle course motion at certain times, in a manner well known in the art, to enable the friction box or other yarn carrier selecting device to engage the desired yarn carrier which in certain courses will be at the opposite side of the knitting section from that of the carrier which laid the yarn of the immediately preceding course.

Figure 7:
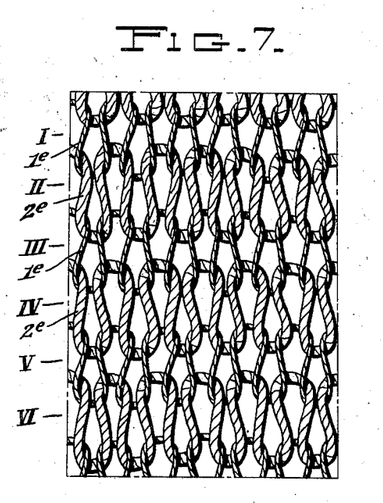
Fig. 7 illustrates a form of stocking fabric in which each series comprises two yarn zones respectively knit from separate yarns of different twists and different sizes.

Fig. 7 is an enlarged detail view of an illustrative embodiment of the invention in which the fabric comprises zones of successive courses I, II, etc., respectively knit from light and heavy yarns 1e and 2e of different twist characteristics. The fabric may be produced generally in the manner of the fabric of Fig. 5.

Figure 6:
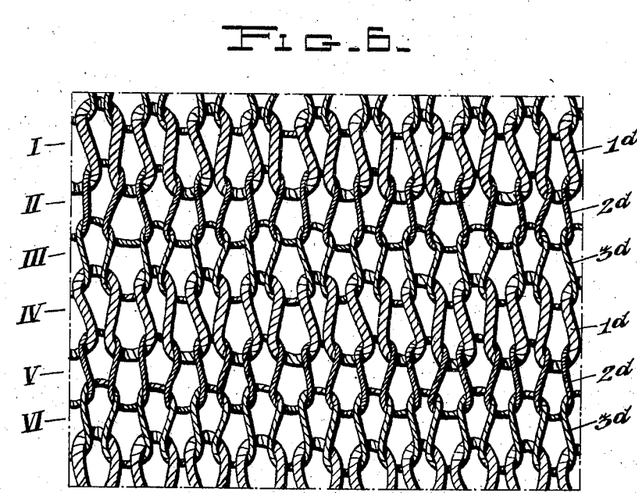
Fig. 6 is an enlarged detail view of a patch of another form of stocking fabric comprising series of three yarn zones respectively knit from separate yarns of different twist characteristics, at least two of the yarns differing in size.

Also, three or more yarns of different sizes and twist characteristics, such as yarns 1d, 2d and 3d, shown in Fig. 6, may be laid in successive courses of the fabric, each course forming a yarn zone. In the form illustrated in this figure, the yarn 1d is heavier than the yarns 2d and 3d which are of the same size, the three yarns respectively comprising different twists, this fabric also being producible with the above mentioned three carrier control devices.

Figure 8:
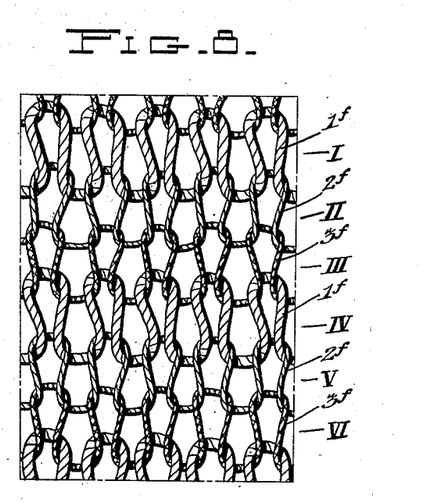
Fig. 8 shows a patch of stocking fabric in which each series comprises three yarn zones respectively knit from three separate yarns of different sizes and different twists, one of the yarns also differing in color from the others.

In Fig. 8 the fabric comprises three or more yarns of different sizes and twist characteristics, such as yarns 1f, 2f and 3f, the yarns being laid in successive courses of the fabric, each course forming a yarn zone, one of the yarns 3f differing in color from the others. The respective yarn zones may be commingled in various ways to produce specifically different desired effects.

Figure 9:
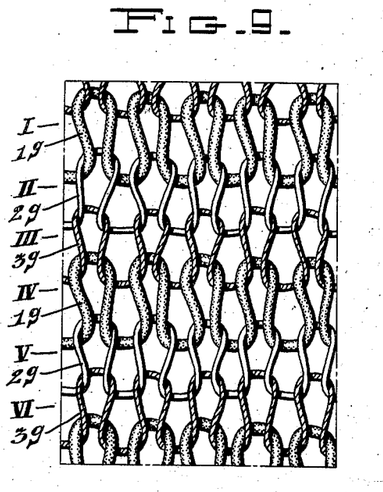
Fig. 9 shows a patch of stocking fabric comprising series of three yarn zones knit from separate yarns respectively of different sizes and different types.

Fig. 9 shows a patch of stocking fabric comprising a multiplicity of series of three yarn zones respectively knit from separate yarns 1g, 2g and 3g of different sizes and different types; for example, and by way of illustration only, the yarn 1g may comprise crepe yarn, yarn 2g may comprise any of the yarns referred to in my aforesaid Patent No. 1,897,051, and the yarn 3g may comprise grenadine yarn.

In the fabrics of Figs. 5 to 9 the heavier yarn gives certain desired characteristics to the stocking, but usually has a tendency to reduce the elasticity of the stocking. This disadvantage, however, is minimized or overcome by the courses of lighter weight yarn or yarns, the loops of which coact with the heavier yarn loops to increase or restore the elasticity of the fabric, so that the above mentioned undesirable characteristic of the heavier yarn is minimized or overcome, the use of the light and heavy yarns in successive courses resulting in a fabric structure in which the desired serviceability, texture, appearance and elasticity are present because of the combined characteristics of the respective yarns. By reason of the action of the courses of lighter yarn or yarns, there is produced an elastic effect heretofore obtained only by lace fabrics or by the use of elastic yarn or by tight and loose loops, notwithstanding that the loops of the various courses as knit may all be of the same length, and that loose course mechanism or variation in the setting of the loop length regulating mechanism of the knitting machine is not required in producing the fabrics disclosed.

While the terms "light" and "heavy" are employed to distinguish the yarns, it will be understood that these terms are relative only; for example, the lighter yarn or yarns may comprise a three-thread yarn, such as is commonly employed in chiffon hosiery throughout the leg portion of a stocking, while the heavier yarn or yarns may comprise a six-thread yarn, commonly employed in the welt of a chiffon stocking; in which case the smaller yarn is three threads or three sizes smaller than the heavier yarn. If the yarn of the leg of the stocking is a four-thread yarn, the yarn of the welt usually comprises a six thread or seven thread yarn, in which case the heavier yarn is either a six-thread or seven-thread yarn, and the lighter yarn a four-thread yarn. In either of the foregoing cases, the smaller yarn is approximately one-half to two-thirds smaller than the larger yarn. Also, in service weight stockings, the heavier yarn normally comprising the welt of a stocking may be a ten-thread yarn, in which case the lighter yarn preferably is several sizes smaller to give the desired elasticity.

The order in which any of the foregoing yarns are laid, and the number of contiguous courses of each yarn, may be varied within wide limits; for example, a plurality of courses of the heavier yarn may be preceded and followed by a single course of the lighter yarn, or single courses of the heavier yarn may be preceded and followed by a plurality of courses of the lighter yarn or yarns, etc., the number and sequence of the different yarn courses depending upon the results desired as to appearance, elasticity, weight of the fabric, etc.

Figure 10:
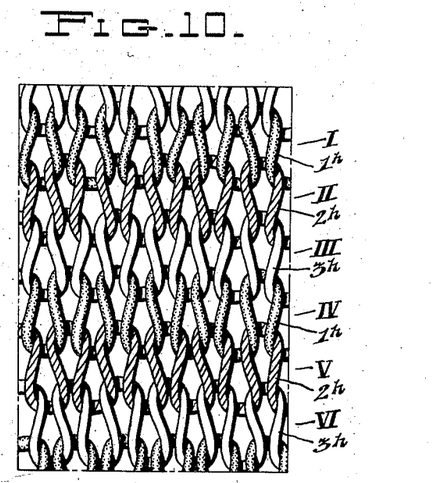
Fig. 10 illustrates a patch of stocking fabric in which the yarn zones of each series comprise three separate yarns of different types respectively, but of the same size.

Also, as shown in Fig. 10, the yarns may be of the same size, and may differ either slightly or considerably in texture or construction, especially in twist characteristics, and may comprise various yarns, as crepe, grenadine, compensene, tram, etc. In the illustrative embodiment of the figure, the yarn 1h is a crepe yarn, yarn 2h is a grenadine yarn, and yarn 3h is of the type disclosed in my above mentioned patent. The various types of yarns may be disposed in any order to give a desired appearance or other characteristic to the stocking.

As will be seen from the selvage edge formations of Figs. 3 and 4, each of the yarns comprising the individual zones of each series extends longitudinally of the blank at a selvage edge thereof to that course in the next series of zones where it is reintroduced, this being the case in all of the illustrative forms of fabrics hereinbefore referred to.

For brevity in the specification and claim, the term "texture" is employed to define the structural characteristics of a yarn, as the number, character and arrangement of the filaments or strands of the yarn.

Of course, the improvements specifically shown and described, by which I obtain the above results, can be changed and modified in various ways without departing from the scope of the invention herein disclosed and hereinafter claimed.

I claim:

A knitted stocking having at least a portion thereof substantially composed of a multiplicity of series of adjacent yarn zones repeated throughout said portion of the stocking, each of said zones comprising one or more courses of body yarns, the individual zones respectively being knit from yarns of different character including a braided yarn, said zones being selectively commingled to give to the fabric a characteristic which is the resultant of the individual characteristics of said zones.

HUGO HEMMERICH.